UNITED STATES PATENT OFFICE.

LOUIS BOCH AND ALBERT F. WHEELER, OF SHEBOYGAN, WISCONSIN.

IMPROVED ARTIFICIAL CORK.

Specification forming part of Letters Patent No. 49,220, dated August 8, 1865.

*To all whom it may concern:*

Be it known that we, LOUIS BOCH and ALBERT F. WHEELER, of Sheboygan, Sheboygan county, in the State of Wisconsin, have invented a new and useful composition of matter to be used in the manufacture of artificial cork and other articles to which the compound is applicable; and we do hereby declare that the following is a full and exact description thereof.

The nature of our invention consists in combining in proper proportions caoutchouc or india-rubber and woody dust or fiber, and molding or pressing the compound into the article, form, or fabric desired.

To enable others skilled in the art to make and use our invention, we will proceed to describe the manner and proportions of the compound of which we claim the invention.

We reduce the woody matter by any appropriate means to as fine a dust as practicable. We then dissolve the caoutchouc or rubber to a semi-fluid condition by applying to it and combining with it the proper quantity of naphtha or benzine, which quantity will differ with the quality of caoutchouc. We then mix and thoroughly incorporate together from four to eight parts of the woody-fiber dust, by weight, to one part of the dissolved caoutchouc. When thoroughly mixed and compounded the composition is molded under sufficient pressure to the form desired; or, if sheets or thin laminæ are desired, it is run upon felts between pressure-rollers.

For the manufacture of artificial cork we prefer the dust or powder of decayed wood or other woody matter.

The utility or advantages of our invention may to some extent be appreciated in connection with the single article of corks or stoppers alone, for we can manufacture from our compound artificial corks equally impervious to liquids with the real cork, and less subject to carbonization by acids or iodine, for one-fourth the cost of the natural cork.

What we claim as our invention, and desire to secure by Letters Patent, is—

A compound of caoutchouc or india-rubber and woody dust or fiber in the proportions hereinbefore set forth, or in any other proportions producing the same results, substantially in the manner and for the purposes herein set forth and described.

LOUIS BOCH.
ALBERT F. WHEELER.

Witnesses:
I. P. WALKER,
CHAS. C. RATTINGER.